US012695183B2

(12) United States Patent
Tao et al.

(10) Patent No.: US 12,695,183 B2
(45) Date of Patent: Jul. 28, 2026

(54) ANTENNA ASSEMBLY COMPRISING A PRINTED CIRCUIT BOARD AND ONE OR MORE ANTENNA MODULES, METHOD OF GROUNDING SUCH AN ANTENNA ASSEMBLY, AND AN ANTENNA MODULE SUITABLE FOR USE IN AN ANTENNA ASSEMBLY

(71) Applicant: THE ANTENNA COMPANY INTERNATIONAL N.V., Willemstad (CW)

(72) Inventors: Yu Tao, Geldrop (NL); Diego Caratelli, Eersel (NL)

(73) Assignee: THE ANTENNA COMPANY INTERNATIONAL N.V., Willemstad (CW)

( * ) Notice: Subject to any disclaimer, the term of this patent is extended or adjusted under 35 U.S.C. 154(b) by 144 days.

(21) Appl. No.: 18/432,524

(22) Filed: Feb. 5, 2024

(65) Prior Publication Data

US 2024/0332791 A1 Oct. 3, 2024

(30) Foreign Application Priority Data

Feb. 6, 2023 (NL) ..................................... 2034092

(51) Int. Cl.
*H01Q 1/52* (2006.01)
*H01Q 1/48* (2006.01)
*H01Q 1/50* (2006.01)

(52) U.S. Cl.
CPC ............... *H01Q 1/526* (2013.01); *H01Q 1/48* (2013.01); *H01Q 1/50* (2013.01)

(58) Field of Classification Search
CPC ........... H01Q 1/526; H01Q 1/48; H01Q 1/50; H01Q 21/28; H01Q 1/24; H01Q 1/44; H01Q 9/40; H01Q 5/321
See application file for complete search history.

(56) References Cited

U.S. PATENT DOCUMENTS 2,571,660 A * 10/1951 Bettan .................... H03H 7/482 330/53
4,931,806 A * 6/1990 Wunderlich ......... H01Q 1/1285 343/900

(Continued)

FOREIGN PATENT DOCUMENTS

KR 10-2004-0052561 A 6/2004
KR 20-2010-0006651 U 7/2010
TW 200915666 A 4/2009

OTHER PUBLICATIONS

Search report conducted by EPO Aug. 17, 2023, in corresponding application NL 2034092.

*Primary Examiner* — Dameon E Levi
*Assistant Examiner* — Jordan E. DeWitt
(74) *Attorney, Agent, or Firm* — Nath, Goldberg & Meyer; Joshua B. Goldberg

(57) ABSTRACT

An antenna assembly includes a printed circuit board and one or more antenna modules. Each module is electrically connected by a respective coaxial cable to the printed circuit board and each antenna module is configured as a planar body having a top surface and a bottom surface. The planar body includes a central planar layer of dielectric material, primary strips of electrically conductive material provided on a top side of the central planar layer, and one or more secondary strips of electrically conductive material provided on a bottom side of the central planar layer. An antenna module, which is suitable for use in an antenna assembly including a printed circuit board and one or more of such antenna modules where each antenna module is electrically connected by a respective coaxial cable to the printed circuit board.

28 Claims, 4 Drawing Sheets

(56) References Cited

U.S. PATENT DOCUMENTS 5,387,919 A * 2/1995 Lam .......................... H01Q 9/18
343/822
6,091,366 A * 7/2000 Zhang .................... H01Q 21/28
343/700 MS
6,337,666 B1 * 1/2002 Bishop ..................... H01Q 9/40
343/702
6,765,539 B1 * 7/2004 Wang ..................... H01Q 21/30
343/700 MS
6,809,698 B2 * 10/2004 Tsai .......................... H01Q 9/16
343/792
6,906,678 B2 * 6/2005 Chen ...................... H01Q 1/243
343/700 MS
7,106,258 B2 * 9/2006 Kuramoto .............. H01Q 21/30
343/795
7,138,948 B2 * 11/2006 Yeh .......................... H01Q 1/38
343/702
7,248,220 B2 * 7/2007 Futamata ................. H01Q 9/42
343/702
7,248,227 B2 * 7/2007 Chen ........................ H01Q 1/38
343/700 MS
7,432,865 B2 * 10/2008 Tsai ......................... H01Q 1/38
343/702
8,228,254 B2 * 7/2012 Foltz ...................... H01Q 19/32
343/795
8,830,135 B2 * 9/2014 Dean ...................... H01Q 21/26
343/700 MS
8,866,685 B2 * 10/2014 Lee .......................... H01Q 9/28
343/770
10,536,128 B1 * 1/2020 Podell ........................ H01P 3/06
10,903,542 B1 * 1/2021 Al-Bondak ........... H01P 11/003
2008/0266198 A1 * 10/2008 Walker ..................... H01Q 1/48
343/846
2008/0316121 A1 * 12/2008 Hobson .................. H01Q 1/243
343/702
2014/0132471 A1 * 5/2014 Tayama ................... H01Q 1/22
29/601
2014/0252547 A1 * 9/2014 Chen ...................... H10D 86/00
257/532
2017/0100020 A1 * 4/2017 Ochi .................... A61B 1/0676
2018/0233817 A1 * 8/2018 Izawa ...................... H01Q 5/35
2019/0199001 A1 * 6/2019 Kato ........................ G06K 7/10
2019/0386629 A1 * 12/2019 Taniguchi ............ H03H 7/1758
2020/0067350 A1 * 2/2020 Moffatt ............... H01F 27/2804
2020/0176855 A1 * 6/2020 Anguera ................ H01Q 5/378
2024/0332791 A1 * 10/2024 Tao .......................... H01Q 9/40

* cited by examiner

ANTENNA ASSEMBLY COMPRISING A PRINTED CIRCUIT BOARD AND ONE OR MORE ANTENNA MODULES, METHOD OF GROUNDING SUCH AN ANTENNA ASSEMBLY, AND AN ANTENNA MODULE SUITABLE FOR USE IN AN ANTENNA ASSEMBLY

The present invention relates to an antenna assembly comprising a printed circuit board and one or more antenna modules, wherein each antenna module is electrically connected by a respective coaxial cable to the printed circuit board. The invention also relates to a grounding method for such an antenna assembly. Furthermore, the invention relates to an antenna module that is suitable for use in an antenna assembly.

An antenna assembly of the above type is well-known in the technological field. In such an assembly, the antenna modules and printed circuit board are typically mounted onto an assembly base or an assembly housing, such that the antenna modules are mounted separately from each other and from the printed circuit board. The printed circuit board is herein designed to control the process of transmitting and receiving radiation waves from the respective antenna modules.

In recent years, the adoption of such antenna assemblies has increased rapidly, mainly due to the introduction of 5G communication networks. In view thereof, it is generally required that the antenna assembly is functional over a frequency range spanning from 0.60 GHz to 6.0 GHz.

Due to the ongoing miniaturization in the field of electronics, the electronic equipment that is applied in such networks is of relatively limited size; hence the dimensions of the antenna module that is used in the antenna assembly have to be of relatively limited size as well.

In this context, an antenna module of a typical flat rectangular design having a length of 100 mm or smaller, and a width of 50 mm or smaller, may be regarded as being of a relatively limited size.

An antenna module of such a relatively small size has the disadvantage that it may result in a significant reduction of the total efficiency of an antenna assembly, wherein such a relatively small antenna module is used. For instance, in the frequency range from 0.60 GHz to 1.0 GHZ, it has been observed that the total efficiency of an antenna assembly with a relatively limited-size antenna module could drop below a critical threshold value of 35%.

When the total efficiency of an antenna assembly drops below the threshold value of 35%, the antenna performance becomes severely compromised in the frequency range from 0.60 GHz to 1.0 GHz. Such a decrease in performance is generally not acceptable for practical use, especially regarding applications of the antenna assembly in hand-held modules.

It is additionally noted that in the higher frequency range of 1.0 GHz to 6.0 GHZ, an even higher critical threshold value of 50% applies. Also, given this other threshold value, it has been observed that the total efficiency of an antenna assembly having antenna modules of the above relatively limited size could also be compromised.

Given the above drawbacks of the antenna assembly according to the prior art, the object of the present invention is to improve the total efficiency of the antenna assembly so that the applicable critical threshold values are complied with over at least a significant part of the frequency range from 0.60 GHz to 6.0 GHz.

To achieve the above objective, the present invention, according to a first aspect thereof, is directed to the provision of:

An antenna assembly comprising a printed circuit board and one or more antenna modules, wherein each antenna module is electrically connected by a respective coaxial cable to the printed circuit board, and wherein each antenna module is configured as a planar body having a top surface and a bottom surface, which planar body comprises:

- a central planar layer of dielectric material;
- primary strips of electrically conductive material provided on a top side of the central planar layer;
- one or more secondary strips of electrically conductive material provided on a bottom side of the central planar layer;

wherein each coaxial cable comprises a central wire and a concentric shielding layer which are isolated from each other by an internal layer of dielectric material and an outer layer of dielectric material covering the shielding layer;

wherein a first end of the coaxial cable is electrically connected to the respective antenna module such that the central wire is connected to a first primary strip, and the shielding layer is connected to a second primary strip, and wherein the second primary strip is electrically isolated from the first primary strip, and wherein a second end of the coaxial cable is electrically connected to the printed circuit board such that the central wire is connected to an electrical feed present on the printed circuit board and the shielding layer is connected to a ground of the printed circuit board, wherein an intermediate section of the shielding layer, which is present between the first and second end of the coaxial cable, is electrically connected to a ground body of electrically conductive material, wherein the intermediate section is electrically connected to the ground body by a capacitor having one terminal electrically connected to the intermediate section and another, opposed terminal electrically connected to the ground body.

In comparison to an antenna assembly according to the prior art, the present invention thus proposes that the shielding layer of the coaxial cable is not merely grounded by a conventional connection to the ground on the printed circuit board, but that additionally an intermediate section of the shielding layer is grounded to a ground body.

The ground body is preferably electrically isolated from the ground of the printed circuit board. Although less preferred, it is also encompassed by the invention that the ground body is electrically connected to the ground of the printed circuit board.

In order to establish the electrical connection between the intermediate section and the ground body, it is preferred that a capacitor is used as specified in the appended claims.

It has been found that by the additional grounding of an intermediate section of the shielding layer in accordance with the present invention, an improved total efficiency of the antenna assembly can be achieved over the intended frequency range of 0.6 to 6.0 GHz. This improvement is such that the total efficiency lies above the two threshold values for a significant part of the frequency range or even the complete frequency range.

Given the above-indicated general aspects of the invention, the following is noted more specifically in the context of the first aspect of the invention:

- the antenna assembly is typically suitable for use in a broad frequency range from 0.60 GHz to 6.0 GHz;
- the antenna modules and the printed circuit board are typically mounted onto an assembly base or an assembly housing, wherein the antenna modules are disposed at a distance from each other and from the printed circuit board;
- the ground present on the printed circuit board is typically provided as a separate conductive body that is grounded and which is electrically isolated from the electrical feed on the printed circuit board;
- The intermediate section of the shielding layer may be present over a relatively short length of the coaxial cable, for instance, over a span of 2 to 10 mm;
- The electrical connection between the intermediate section of the shielding layer and the capacitor can expediently be realized by removing the outer layer of the coaxial cable so that the shielding layer is exposed.

It is preferred in the antenna assembly, according to the invention, that the intermediate section of the shielding layer is electrically connected to the capacitor by an anchoring body of electrically conductive material, wherein preferably the anchoring body is configured as a clamp in which the intermediate section of the shielding layer is clamped in an electrically connecting manner.

- Such an anchoring body establishes a practically expedient connection that is adapted on one end to contact the intermediate section directly and, on the other end, is adapted to contact the capacitor directly.
- Furthermore, it is preferred that the anchoring body is surrounded by a jacket of dielectric material, which constitutes an electrical isolation from the ground body, and that the capacitor bridges over the jacket of dielectric material and connects the anchoring body with the ground body.

Preferably in the antenna assembly, according to the invention, the capacitor has a capacitance of at least 1 pF, preferably 4 pF, more preferably at least 5 pF, and most preferably at least 10 pF.

- Such an antenna assembly that includes a capacitor with the above preferred minimum capacitance has been found to be effective in achieving a satisfactory total efficiency of the antenna assembly. This advantageous effect of the capacitor was found to increase slightly with higher capacitance values. In practice, the capacitance value should preferably not exceed a value of 50 pF.

It is particularly preferable in the antenna assembly, according to the invention, that the intermediate section of the shielding layer has a position on the coaxial cable that is such that a residual length of the coaxial cable is present between the intermediate section of the shielding layer and the first end of the coaxial cable, which residual length lies in the range of 2-20 centimeter, preferably 5-10 centimeter.

- In the antenna assembly, according to the invention, the coaxial cables contribute to the performance of the antenna assembly because each coaxial cable has the inherent property of creating a resonance effect in a low-frequency range, in particular in the frequency range of 0.6 to 1.0 GHz. This advantageous effect is significantly pronounced when the above-indicated residual length of the coaxial cable is observed.
- For completeness, it is noted that the above advantageous effect is primarily attained regarding the residual length of the coaxial cable as is present between the intermediate section and the connection to the antenna module. In contrast, the other residual length of the coaxial cable between the intermediate section and the second end of the coaxial cable, which is connected to the printed circuit board, is of far less influence in achieving the advantageous effect. Therefore, any practically applicable length may be applied for this other residual length, and for instance, a length in a range of 1-30 cm may be used.

It is practically expedient in the antenna assembly, according to the invention, that:

- the capacitor and/or the ground body are structures that are integral parts of the printed circuit board;
- and/or the anchoring body is a structure that is an integral part of the printed circuit, wherein, preferably, the anchoring body is surrounded by a jacket of dielectric material.

When the anchoring body is surrounded by a jacket of dielectric material according to the above-preferred embodiment, the capacitor is provided as a bridging structure over the surrounding jacket of dielectric material and connects the anchoring body with the ground body.

According to a further preferred embodiment of the invention, the antenna assembly comprises a number of antenna modules, which are each electrically connected by a respective coaxial cable to a printed circuit board,

- wherein each antenna module is mounted on an assembly base such that each antenna module has a fixed orientation and is disposed separately from other antenna modules, wherein at least two antenna modules, preferably at least three antenna modules, each have a planar orientation that is non-parallel to the other.
- The separation of the individual antenna modules, as well as the inclusion of antenna modules having a planar orientation that is non-parallel to each other, contributes to raising the performance of the antenna assembly over the intended frequency range.
- It is noted that the planar orientation of the antenna module is herein defined by the orientation of the imaginary plane in which the planar body is arranged.
- Particularly preferred in this embodiment is that at least two antenna modules are mounted in an orthogonal orientation to each other.

It is furthermore attractive for the antenna assembly, according to the invention, when the bottom side of the central planar layer of each antenna module is provided with a connected secondary strip which is electrically connected to the second primary strip by vias of electrically conductive material that extend through the central planar layer from the bottom side to the top side thereof.

- As such, the antenna module is provided on both sides of the central planar layer with a primary and secondary strip, which are each electrically grounded.

According to the invention, it is also attractive for the antenna assembly when the bottom side of the central planar layer of each antenna module is provided with an isolated secondary strip which is electrically isolated from other electrically conductive structures of the respective antenna module.

- As such, the antenna module is provided on one side with an isolated secondary strip which creates an additional capacitor functionality by the resultant interaction between the isolated secondary strip and other electrically conductive structures of the respective antenna module.

Given the above-presented objective of the invention, a second aspect of the present invention is directed to the provision of:

A method of grounding an antenna assembly, in particular, an antenna assembly according to the above first aspect of the invention, comprising the steps of:

providing a printed circuit board and one or more antenna modules, wherein each antenna module is electrically connected by a respective coaxial cable to the printed circuit board and wherein each antenna module is configured as a planar body having a top side and a bottom side, wherein each coaxial cable comprises a central wire and a concentric shielding layer which are isolated from each other by an internal layer of dielectric material and an outer layer of dielectric material covering the shielding layer, wherein a first end of the coaxial cable is electrically connected to the respective antenna module, such that the central wire is connected to a first primary strip on a top side of the antenna module, and the shielding layer is connected to a second primary strip on the top side of the antenna module, and wherein the second primary strip is electrically isolated from the first primary strip, and wherein a second end of the coaxial cable is electrically connected to the printed circuit board such that the central wire is connected to an electrical feed present on the printed circuit board and the shielding layer is connected to a ground of the printed circuit board;

wherein further, an intermediate section of the shielding layer, which is present between the first and second end of the coaxial cable, is electrically connected to a ground body of electrically conductive material, and wherein the intermediate section is electrically connected to the ground body by a capacitor having one terminal electrically connected to the intermediate section and another, opposed terminal electrically connected to the ground body.

The method of grounding an antenna assembly as defined above, achieves the same advantageous effects outlined above regarding the first aspect of the invention.

Furthermore in the context of the above method of the invention, it is preferred that the capacitor has a capacitance of at least 1 pf, preferably 4 pF, more preferably at least 5 pF, and most preferably at least 10 pF.

It is particularly preferred in the method according to the invention, that the residual section of the shielding layer has a position on the coaxial cable that is such that a residual length of the coaxial cable is present between the intermediate section of the shielding layer and the first end of the coaxial cable, which residual length lies in the range of 2-20 centimeter, preferably 5-10 centimeter.

Another third aspect of the invention is directed to achieving the above-discussed objective of the invention by the provision of:

An antenna module that is suitable for use in an antenna assembly comprising a printed circuit board and one or more of such antenna modules, wherein each antenna module is electrically connected by a respective coaxial cable to the printed circuit board, wherein the antenna module is configured as a planar body having a top surface and a bottom surface, wherein the planar body comprises:

a central planar layer of dielectric material;

primary strips of electrically conductive material provided on a top side of the central planar layer;

one or more secondary strips of electrically conductive material provided on a bottom side of the central planar layer;

wherein the primary strips comprise a first primary strip and a second primary strip, which are electrically isolated from each other, the first primary strip being configured to be connected to a feeding line of a coaxial cable and the second primary strip being configured to be connected to a ground line of a coaxial cable;

and wherein the one or more the secondary strips comprise:

an isolated secondary strip that is electrically isolated from other electrically conductive structures of the respective antenna module, and optionally, a connected secondary strip which is electrically connected to the second primary strip by vias of electrically conductive material that extend through the central planar layer from the bottom side to the top side thereof.

It has been found that the above antenna module, according to the invention, is effective in the improvement of the total efficiency of an antenna assembly that includes such an antenna module, especially when the antenna module is of relatively small size, as discussed above.

Especially relevant in achieving the above advantageous effect are the specific configurations of the primary and secondary strips of the antenna module.

In the context of the third aspect of the invention, it is noted that the antenna module is configured to be suitable for use in a broad frequency range from 0.60 GHz to 6.0 GHz.

Preferably in the antenna module, according to the invention, the planar body of the antenna module has a rectangular periphery defined by a length and a width of the planar body.

Furthermore, it is generally preferred that the planar body of the antenna module has a length of 100 mm or smaller, preferably 75 mm or smaller, more preferably 50 mm or smaller, and a width of 50 mm or smaller, preferably 25 mm or smaller, more preferably 15 mm or smaller.

Concerning the primary strips that are included in the antenna module according to the invention, the following features are independently preferred:

the first primary strip comprises a microstrip as a feeding line, preferably extending in the length direction of the planar body and, more preferably, positioned at half the width of the planar body;

the first primary strip comprises a meandering strip having a first end and a second end, wherein the first end is preferably connected to a feeding line, and a second end is preferably connected to a linear strip;

the meandering strip extends in the length direction of the planar body and is preferably positioned at half the width of the planar body;

the first primary strip comprises a linear strip that extends in the length direction of the planar body and is preferably positioned at half the width of the planar body;

the second primary strip contains a strip that is disposed laterally to the first primary strip and preferably includes two electrically connected strips that are disposed at opposed lateral sides of the first primary strip.

Given the above-indicated embodiment wherein the second primary strip contains two electrically connected strips that are disposed at opposed lateral sides of the first primary strip, it is noted that preferably each of the two strips is electrically connected to the connected secondary strip by electrically conductive vias.

In the antenna module, according to the invention, it is preferred that the connected secondary strip comprises a wide strip that extends over the width of the planar body, which wide strip is preferably provided with an extension strip of a smaller width that extends in the length direction and which extension strip is more preferably positioned at half the width of the planar body.

According to the invention, it is further preferred in the antenna module that the isolated secondary strip comprises a linear strip extending in the length direction of the planar body, which is preferably positioned at half the width of the planar body.

Depending on the specific geometries of the primary and secondary strips which are chosen for the antenna module according to the invention, one or more of the strips may additionally be provided with slots for further enhancement of the antenna performance.

In a further preferred embodiment of the antenna module according to the invention, the first primary strip extends in the length direction of the planar body and comprises a meandering strip having a first end and a second end which is connected to a linear strip, wherein the ratio of the combined length of the meandering strip and the linear strip relative to the overall length of the planar body is in the range of 12/50 up to 30/50 and preferably in the range of 14/50 up to 25/50.

In another preferred embodiment of the antenna module according to the invention, the connected secondary strip comprises a wide strip that extends over the width direction of the planar body and which is provided with an extension strip of smaller width that extends in the length direction, wherein the ratio of the combined length of the broad strip and the extension strip relative to the overall length of the planar body is in the range of 30/50 up to 40/50 and preferably in the range of 32/50 up to 36/50.

The above-indicated ratios of lengths for the first primary and the connected secondary strip of the antenna module are especially effective in achieving a satisfactory total efficiency for an antenna assembly comprising such an antenna module.

In the antenna module according to the invention, it is further advantageous when the first and the second primary strips are configured to be connectable to a coaxial cable at a longitudinal end of the planar body.

Furthermore, it is preferred in the antenna module according to the invention, that the connected secondary strip on the bottom side of the central planar layer overlaps with the first and second primary strips on the top side of the central planar layer and that preferably the first primary strip comprises a microstrip as a feeding line and a meandering strip connected to the microstrip, which are both overlapped by the connected secondary strip.

It is also preferred in the antenna module according to the invention, that the isolated secondary strip on the bottom side of the central planar layer overlaps with the first primary strip on the top side of the central planar layer and that preferably the first primary strip comprises a linear strip which is overlapped by the isolated secondary strip.

According to the invention, it is further advantageous for the antenna module that the planar body has a thickness in the range of 0.2 to 3.2 mm.

Given the above-defined first and third aspects of the invention, the present invention furthermore relates to the explicit provision of:

an antenna assembly according to the first aspect of the invention, further comprising an assembly housing onto which the printed circuit board and the one or more antenna modules are mounted, wherein each antenna module is an antenna module according to the third aspect of the invention.

Given the above-defined second and third aspects of the invention, the present invention furthermore relates to the explicit provision of:

a method of grounding an antenna assembly according to the second aspect of the invention, wherein each antenna module is an antenna module according to the third aspect of the invention.

EXAMPLES

Preferred embodiments of the invention are further discussed below with reference to the appended figures, wherein.

Figure 6:
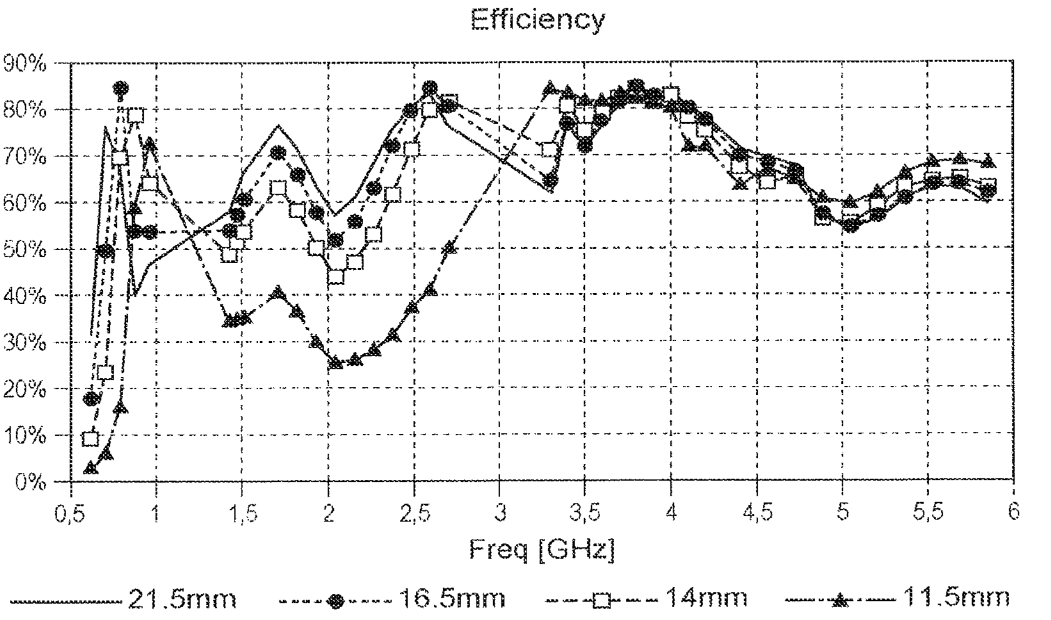
Figure 7:
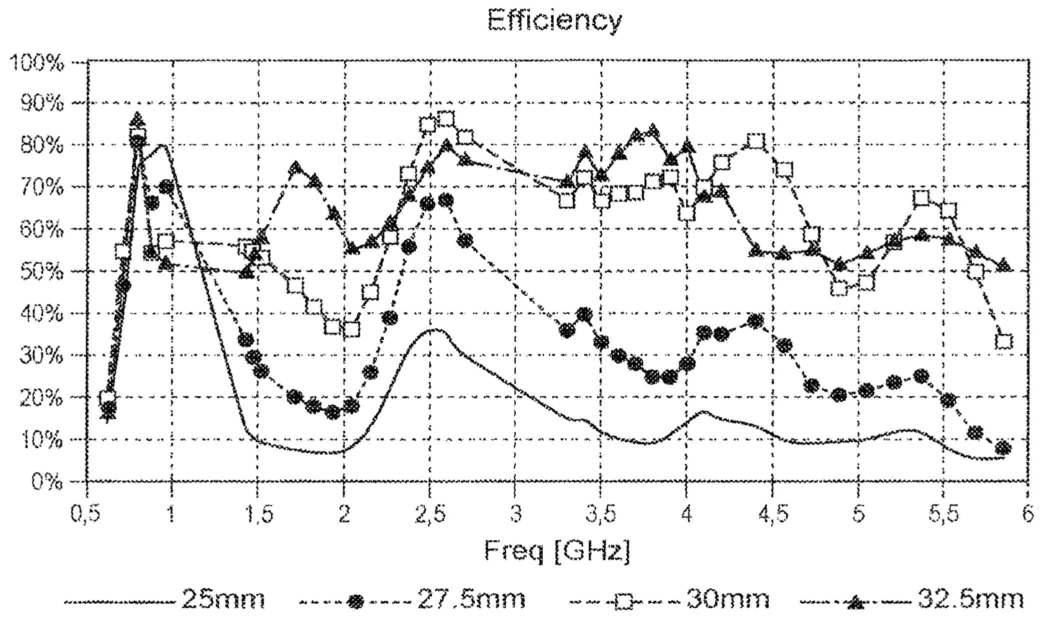

FIGS. 6 and 7 each show a respective graph of the total efficiency of an antenna assembly according to the invention for various values of L1 and L2 of the antenna module.

Figure 1:
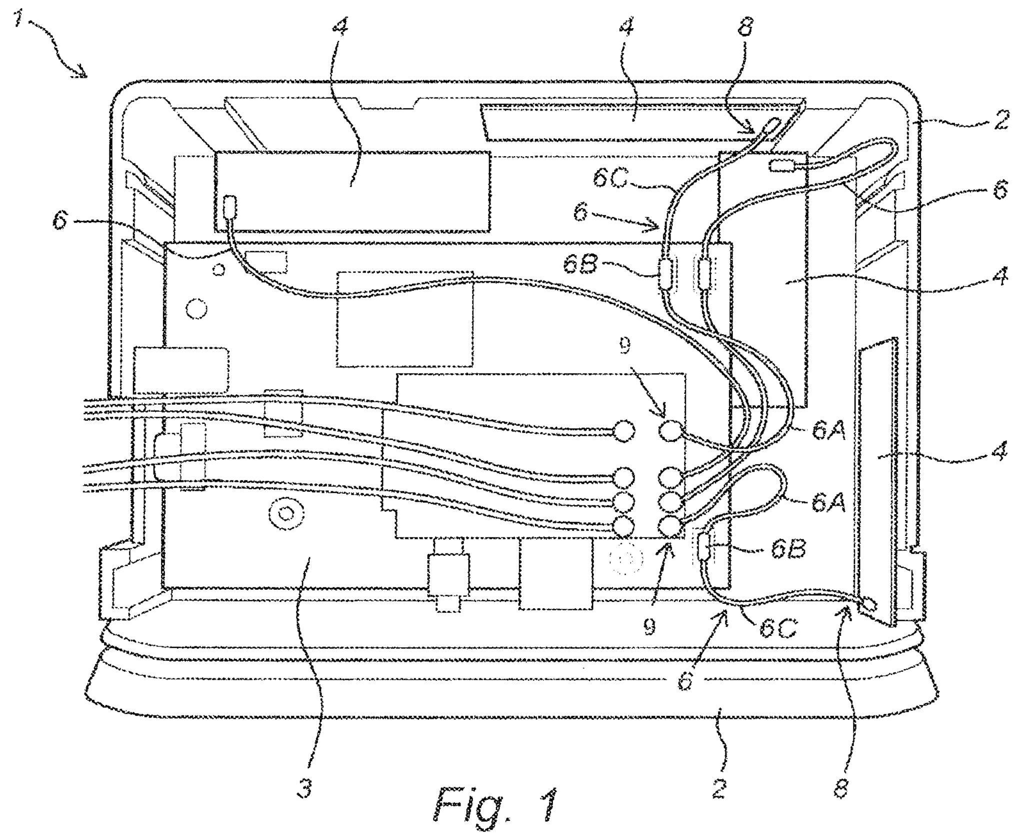
FIG. 1 shows a preferred configuration of an antenna assembly according to the invention.

FIG. 1 shows an antenna assembly 1, which comprises a printed circuit board 3 and several antenna modules 4, each mounted onto a box-shaped assembly base 2. Each antenna module is electrically connected by a respective coaxial cable 6 to the printed circuit board 3. Each coaxial cable 6 is of a commonly known configuration, i.e., comprising a central wire and a concentric shielding layer which are isolated from each other by an internal layer of dielectric material and an outer layer of dielectric material covering the shielding layer.

A first end 8 of the coaxial cable 6 is electrically connected to the respective antenna module, and a second end 9 is electrically connected to the printed circuit board 3. The coaxial cable 6 is at the second end electrically connected such that the central wire is connected to an electrical feed on the printed circuit board 3, and the shielding layer is connected to a ground of the printed circuit board 3.

Figure 3:
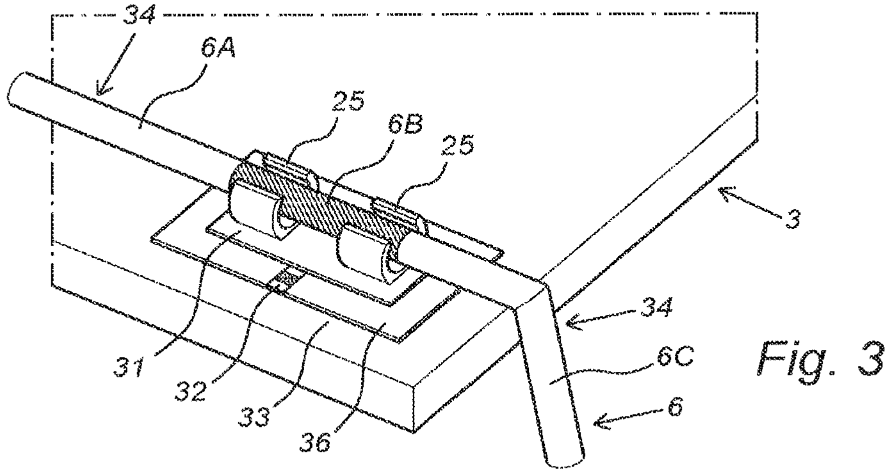
FIG. 3 shows a detail of a preferred configuration of an antenna assembly as shown in FIG. 1.

Between the two ends 8 and 9 of each coaxial cable 6, an intermediate section 6B of a shielding layer is present, which is grounded via a capacitor to a ground body (shown in more detail in FIG. 3).

A residual length of the coaxial cable 6C is present between the intermediate section 6B and the first end 8, which residual length lies in the range of 2-20 centimeters, preferably 5-10 centimeters. Another residual length 6A of the coaxial cable is present between the intermediate section 6B and the second end 9, which length varies in the range of 1-30 centimeters.

The antenna modules 4 are mounted on the assembly base 2 such that each antenna module has a fixed orientation and is disposed separately from other antenna modules. Three antenna modules 4 have a planar orientation that is non-parallel to the others and are mounted in an orthogonal orientation to each other.

Figure 2:
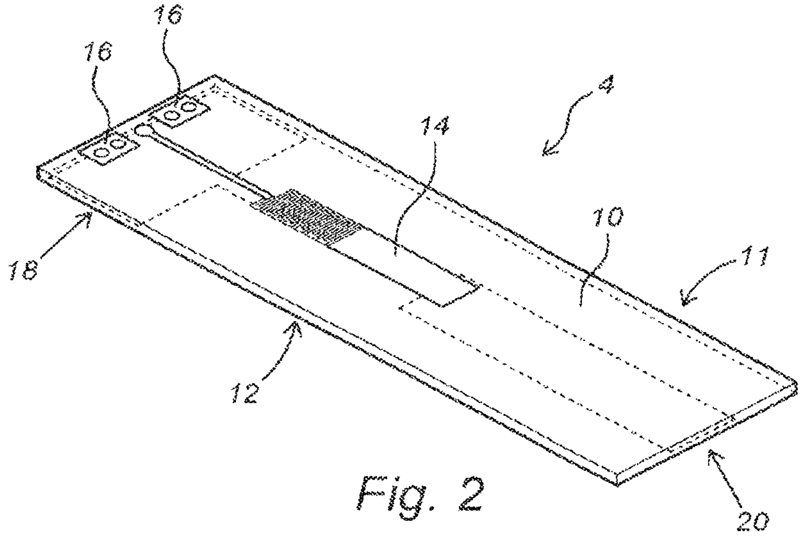
FIG. 2 shows in perspective a preferred configuration of an antenna module according to the invention.

FIG. 2 shows an individual antenna module 4 that is suitable to be used in the antenna assembly shown in FIG. 1. The antenna module 4 is configured as a planar body having a top surface and a bottom surface, wherein the planar body is composed of:

- a central planar layer 10 of dielectric material;
- primary strips 14, 16 of electrically conductive material provided on a top side 11 of the layer 10;
- one or more secondary strips 18, 20 of electrically conductive material provided on a bottom side 12 of the layer 10.

The antenna module 4 has a rectangular periphery defined by a length and a width of the planar body, which are 50 mm and 15 mm, respectively. The thickness of the antenna module 4 is about 3 mm.

On the top side of the module 4, primary strips 14, 16 are provided, which comprise a first primary strip 14 and second primary strips 16, which are electrically isolated from each other. The first primary strip 14 is configured to be connected to a coaxial cable feeding line, and the second primary strips 16 are configured to be connected to a ground line of a coaxial cable.

On the bottom side of the module 4, secondary strips 18, 20 are provided, which comprise a connected secondary strip 18, which is electrically connected to the second primary strip by electrically conductive vias (shown in FIG. 4A/B) that extend through the central planar layer 10 from its bottom side 12 to its top side 11, and an isolated secondary strip 20 which is electrically isolated from other electrically conductive structures of the respective antenna module 4.

It is noted that in FIG. 2, the central planar layer 10 is depicted as if it were a transparent layer so that the positions of the secondary strips 18, 20 on the bottom side are visible relative to the positions of the primary strips 14, 16 on the top side.

FIG. 3 shows a corner of the printed circuit board 3 of the antenna assembly shown in FIG. 1. Over this corner, a coaxial cable 6 is led, having an intermediate section 6B of the shielding layer, which is clamped in an anchoring body 31 of electrically conductive material.

The anchoring body 31 comprises two clamps 35, and is surrounded by a jacket 36 of dielectric material which isolates the anchoring body from a ground body 33. A capacitor 32 is arranged as a bridge over the insulating jacket 36, wherein one terminal of the capacitor 32 is electrically connected to the anchoring body 31, and an opposed terminal of the capacitor is electrically connected to the ground body 33. The capacitor has a capacitance of about 20 pF. All the structures 31, 36, 32, and 31 are provided as integral parts of the printed circuit board 3.

Outside the intermediate section 6B, the coaxial cable 6 has a residual length 6C connecting with an antenna module and a residual length 6A connecting with the printed circuit board 3. The residual lengths 6A and 6C of the coaxial cable 6 are covered by an insulating layer 34. In contrast, the insulating layer 34 is removed from the coaxial cable 6 at the intermediate section 6B so that the shielding layer is exposed at the intermediate section 6B.

Figure 4A:
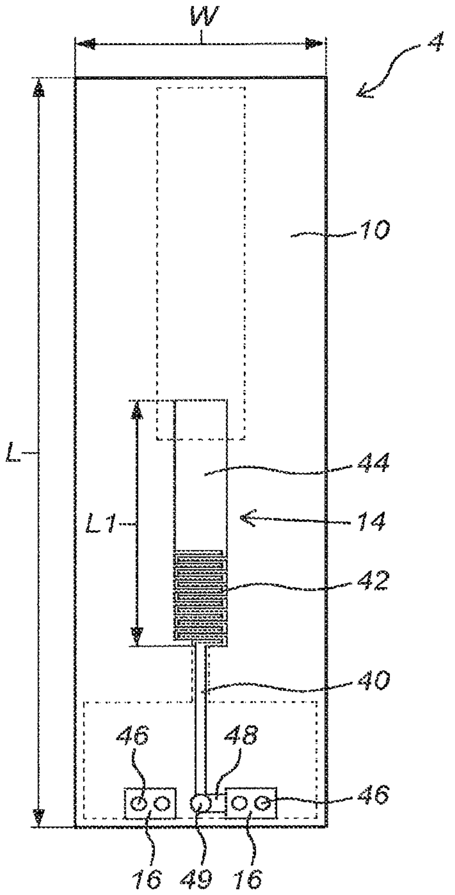
FIGS. 4A and 4B show the top side and bottom side of an antenna module as shown in FIG. 2.

FIG. 4A shows a top side of an antenna module 4, as shown in FIG. 2, configured as a planar body having a length L and a width W. Like FIG. 2, the central planar layer 10 is depicted in FIG. 4A as if it were a transparent layer.

On the top side, a first primary strip 14 is provided, which extends in the length direction L of the planar body and is positioned at half the width W of the planar body.

The first primary strip comprises a meandering strip 42 having a first end and a second end. The first end of the strip 42 is connected to a feeding line 40 in the format of a microstrip, and the second end of the strip 42 is connected to a linear strip 44. The microstrip 40 has one connector end 49, configured to be connected to a central wire of a coaxial cable. The combined length of the meandering strip 42 and the linear strip 44 is indicated as L1.

Furthermore, two second primary strips 16 are provided, which are connected to vias 46 that extend through the central planar layer 10. The right second primary strip 16 is connected to a connector point 48, configured to connect with a ground line of a coaxial cable, e.g., a shielding layer of a coaxial cable.

Figure 4B:
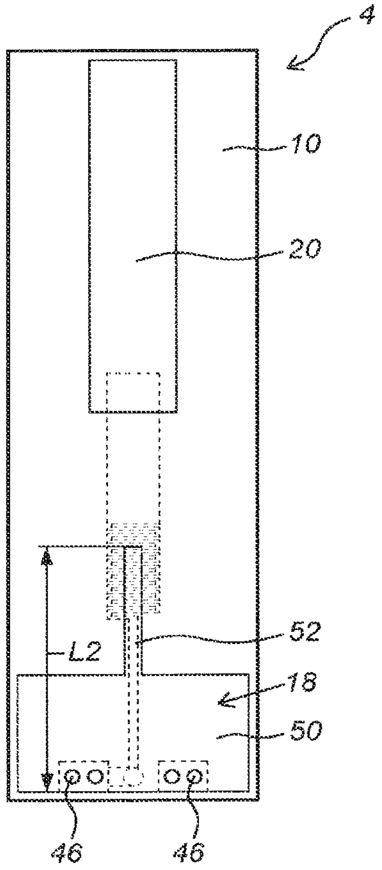

FIG. 4B shows the bottom side of the antenna module 4, as shown in FIG. 2, configured as a planar body having a length L and a width W, as depicted in FIG. 4A.

On the bottom side, a connected secondary strip 18 is provided which is positioned at half the width W of the planar body. The secondary strip 18 contains a wide strip 50, which extends over the width W of the module 4 and is provided with an extension strip 52 of a smaller width that extends in the length direction L. The combined length of the wide strip 50 and the extension strip 52 is indicated as L2. The wide strip 50 is connected to the vias 46, extending through the central planar layer 10.

Furthermore, an isolated secondary strip 20 is provided, which is electrically isolated from other electrically conductive structures of the antenna module 4.

Figure 5:
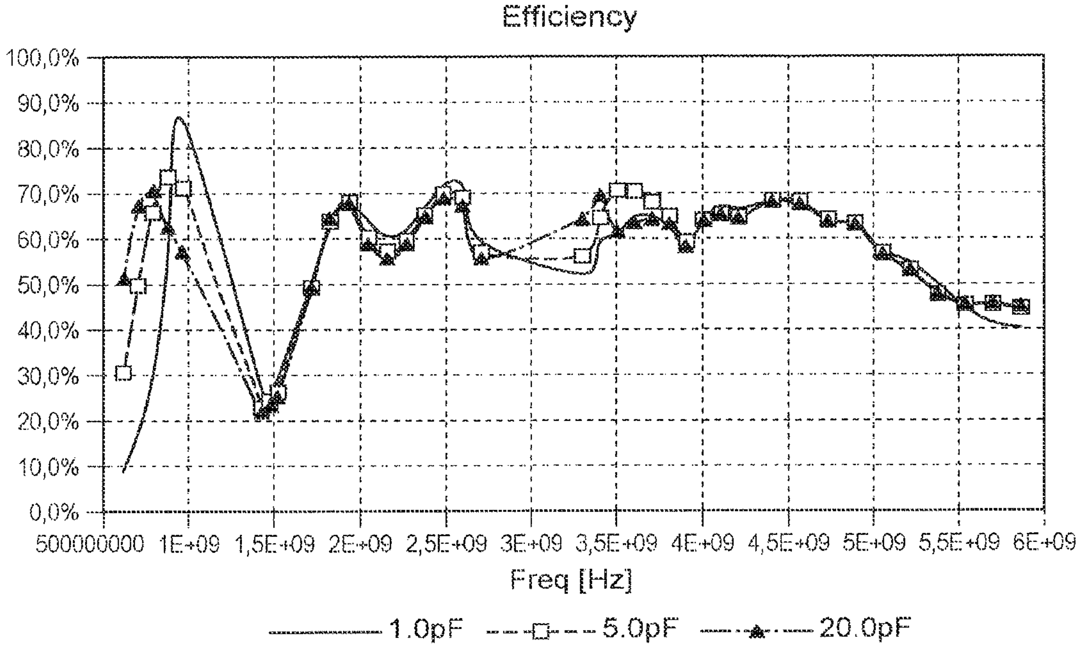
FIG. 5 shows a graph of the total efficiency of an antenna assembly according to the invention for various capacitance values of the capacitor.

FIG. 5 shows a graph of the total efficiency (on the y-axis) of an antenna assembly according to the invention over a broad frequency range of 0.50 GHz up to 6.0 GHz (on the x-axis). The antenna assembly is configured as depicted in FIG. 1, wherein the antenna modules 4 are configured as illustrated in FIG. 2 and FIG. 4A/B. Furthermore, the antenna modules 4 have a primary strip 14 and a secondary strip 18 of such dimensions that the combined length L1 is 32.5 mm and the combined length L2 is 16.5 mm.

The graph shows the total efficiency of the antenna assembly for various capacitance values of the capacitor that is applied in the assembly.

The results show that an attractive total efficiency for the antenna assemblies can be obtained when the capacitor that is applied has a capacitance of 5 pF or higher. These results are further improved when the capacitance is 10 pF or higher.

The results show furthermore that also a relatively low capacitance of 1.0 pF could still be an attractive option for an antenna assembly which is intended to be used in a frequency range from 0.80 GHz up to 6.0 GHz.

FIG. 6 shows a graph of the total efficiency (on the y-axis) of an antenna assembly according to the invention over a broad frequency range of 0.50 GHz up to 6.0 GHz (on the x-axis). The antenna assembly is configured as depicted in FIG. 1, wherein the antenna modules 4 are configured as illustrated in FIG. 2. One detail in the antenna assembly is herein different from the configuration of FIG. 1: the intermediate section 6B of the shielding layer is not grounded via a capacitor to a ground body (as shown in FIG. 3), but is instead grounded via a zero-ohm link as an alternative to the capacitor.

The graph shows the total efficiency of the antenna assembly for various L1 values of the antenna module that is applied in the assembly. As explained above, L1 is the combined length of the meandering strip 42 and the linear strip 44 as indicated in FIG. 4A.

The results show that an attractive total efficiency for the antenna assemblies is obtained when the applied antenna module has an L1 value in the range of 16 mm up to 22 mm. As the total length L of the antenna module is 50 mm, the ratio of L1/L over this effective range is 16/50 up to 22/50.

The results show furthermore that also a relatively low value of L1 of 14 mm could still be an attractive option for an antenna assembly which is intended to be used in a frequency range from 0.70 GHz up to 6.0 GHz.

Even a value of L1 of 11.5 mm may still be considered, dependent on the specific application of the antenna assembly.

FIG. 7 shows a graph of the total efficiency (on the y-axis) of an antenna assembly according to the invention over a broad frequency range of 0.50 GHz up to 6.0 GHZ (on the x-axis). The antenna assembly is configured as depicted in FIG. 1, wherein the antenna modules 4 are configured as illustrated in FIG. 2. One detail in the antenna assembly is herein different from the configuration of FIG. 1: the intermediate section 6B of the shielding layer is not grounded via a capacitor to a ground body (as shown in FIG. 3), but is instead grounded via a zero-ohm link as an alternative to the capacitor.

The graph shows the total efficiency of the antenna assembly for various L2 values of the antenna module that is applied in the assembly. As explained above, L2 is the combined length of the broad strip 50 and the extension strip 52 as indicated in FIG. 4B.

The results show that an attractive total efficiency for the antenna assemblies is obtained when the applied antenna module has an L2 value in the range of 30 mm up to 35 mm. As the total length L of the antenna module is 50 mm, the ratio of L2/L over this effective range is 30/50 up to 35/50.

The results show furthermore that also a relatively low value of L2 of 25 mm to 27.5 mm could still be an attractive option for an antenna assembly which is intended to be used in a frequency range from 0.60 GHz up to 1.0 GHZ.

The invention claimed is:

1. Antenna assembly comprising a printed circuit board and one or more antenna modules, wherein each antenna module is electrically connected by a respective coaxial cable to the printed circuit board, and wherein each antenna module is configured as a planar body having a top surface and a bottom surface, which planar body comprises:

a central planar layer of dielectric material;

primary strips of electrically conductive material provided on a top side of the central planar layer;

one or more secondary strips of electrically conductive material provided on a bottom side of the central planar layer;

wherein each coaxial cable comprises a central wire and a concentric shielding layer which are isolated from each other by an internal layer of dielectric material, and an outer layer of dielectric material covering the shielding layer;

wherein a first end of the coaxial cable is electrically connected to the respective antenna module such that the central wire is connected to a first primary strip, and the shielding layer is connected to a second primary strip, and wherein the second primary strip is electrically isolated from the first primary strip, and wherein a second end of the coaxial cable is electrically connected to the printed circuit board such that the central wire is connected to an electrical feed present on the printed circuit board and the shielding layer is connected to a ground of the printed circuit board, characterized in that an intermediate section of the shielding layer, which is present between the first and second end of the coaxial cable, is electrically connected to a ground body of electrically conductive material, wherein the intermediate section is electrically connected to the ground body by a capacitor having one terminal electrically connected to the intermediate section and another, opposed terminal electrically connected to the ground body.

2. Antenna assembly according to claim 1, wherein the intermediate section of the shielding layer is electrically connected to the capacitor by an anchoring body of electrically conductive material, wherein preferably the anchoring body is configured as a clamp in which the intermediate section of the shielding layer is clamped in an electrically connecting manner.

3. Antenna assembly according to claim 2, wherein the anchoring body is surrounded by a jacket of dielectric material, which constitutes an electrical isolation with the ground body, and wherein the capacitor bridges over the jacket of dielectric material and connects the anchoring body with the ground body.

4. Antenna assembly according to claim 1, wherein the capacitor has a capacitance of at least 1 pF, preferably at least 4 pF, more preferably at least 5 pF, most preferably at least 10 pF.

5. Antenna assembly according to claim 1, wherein the intermediate section of the shielding layer has a position on the coaxial cable which is such that a residual length of the coaxial cable is present between the intermediate section of the shielding layer and the first end of the coaxial cable, which residual length lies in the range of 2-20 centimeter, preferably 5-10 centimeter.

6. Antenna assembly according to claim 1, wherein the capacitor and/or the ground body are structures which are integral parts of the printed circuit board.

7. Antenna assembly according to claim 2, wherein the anchoring body is a structure that is an integrated part of the printed circuit board, and preferably the anchoring body is surrounded by a jacket of dielectric material.

8. Antenna assembly according to claim 1, wherein the antenna assembly comprises a number of antenna modules, which are each electrically connected by a respective coaxial cable to a printed circuit board, wherein each antenna module is mounted on an assembly base such that each antenna module has a fixed orientation and is disposed separately from other antenna modules, wherein at least two antenna modules, preferably at least three antenna modules, each have a planar orientation that is non-parallel to the other.

9. Antenna assembly according to claim 8, wherein at least two antenna modules that each have a planar orientation which is non-parallel to the other, are mounted in an orthogonal orientation to each other.

10. Antenna assembly according to claim 1, wherein the bottom side of the central planar layer of each antenna module is provided with a connected secondary strip which is electrically connected to the second primary strip by electrically conductive vias that extend through the central planar layer from the bottom side to the top side thereof.

11. Antenna assembly according to claim 1, wherein the bottom side of the central planar layer of each antenna module is provided with an isolated secondary strip which is electrically isolated from other electrically conductive structures of the respective antenna module.

12. Method of grounding an antenna assembly, comprising the steps of:

providing a printed circuit board and one or more antenna modules, wherein each antenna module is electrically connected by a respective coaxial cable to the printed circuit board and wherein each antenna module is configured as a planar body having a top side and a bottom side, wherein each coaxial cable comprises a central wire and a concentric shielding layer which are isolated from each other by an internal layer of dielectric material and an outer layer of dielectric material covering the shielding layer, wherein a first end of the coaxial cable is electrically connected to the respective antenna module, such that the central wire is connected to a first primary strip on a top side of the antenna module, and the shielding layer is connected to a second primary strip on the top side of the antenna module, and wherein the second primary strip is electrically isolated form the first primary strip, and wherein a second end of the coaxial cable is electrically connected to the printed circuit board such that the central wire is connected to an electrical feed present on the printed circuit board and the shielding layer is connected to a ground present on the printed circuit board;

characterized in that an intermediate section of the shielding layer, which is present between the first and second end of the coaxial cable, is electrically connected to a ground body of electrically conductive material, and wherein the intermediate section is electrically connected to the ground body by a capacitor having one terminal electrically connected to the intermediate section and another, opposed terminal electrically connected to the ground body.

13. Method according to claim 12, wherein the capacitor has a capacitance of at least 1 pF, preferably at least 4 pF, more preferably at least 5 pF, and most preferably at least 10 pF.

14. Antenna assembly according to claim 1, wherein the first primary strip comprises a microstrip as a feeding line, preferably extending in the length direction of the planar body and more preferably positioned at half the width of the planar body.

15. Antenna assembly according to claim 1, wherein the first primary strip comprises a meandering strip having a first end and a second end, wherein the first end is preferably connected to a feeding line, and a second end is preferably connected to a linear strip.

16. Antenna assembly according to claim 15, wherein the meandering strip extends in the length direction of the planar body and is preferably positioned at half the width of the planar body.

17. Antenna assembly according to claim 1, wherein the first primary strip comprises a linear strip that extends in the length direction of the planar body, and is preferably positioned at half the width of the planar body.

18. Antenna assembly according to claim 1, wherein the second primary strip contains a strip that is disposed laterally to the first primary strip and preferably includes two electrically connected strips that are disposed at opposed lateral sides of the first primary strip.

19. Antenna assembly according to claim 1, wherein the connected secondary strip comprises a wide strip that extends over the width of the planar body, which wide strip is preferably provided with an extension strip of a smaller width that extends in the length direction and which extension strip is more preferably positioned at half the width of the planar body.

20. Antenna assembly according to claim 1, wherein the isolated secondary strip comprises a linear strip extending in the length direction of the planar body, which linear strip is preferably positioned at half the width of the planar body.

21. Antenna assembly according to claim 1, wherein the first primary strip extends in the length direction of the planar body and comprises a meandering strip having a first end and a second end which is connected to a linear strip, wherein the ratio of the combined length of the meandering strip and the linear strip relative to the overall length of the planar body is in the range of 12/50 up to 30/50 and preferably in the range of 14/50 up to 25/50.

22. Antenna assembly according to claim 1, wherein the connected secondary strip comprises a broad strip that extends over the width direction of the planar body and which is provided with an extension strip of smaller width that extends in the length direction, wherein the ratio of the combined length of the broad strip and the extension strip relative to the overall length of the planar body is in the range of 30/50 up to 40/50 and preferably in the range of 32/50 up to 36/50.

23. Antenna assembly according to claim 1, wherein the first and the second primary strips are configured to connect to a coaxial cable at a longitudinal end of the planar body.

24. Antenna assembly according to claim 1, wherein the connected secondary strip on the bottom side of the central planar layer overlaps with the first and second primary strips on the top side of the central planar layer, and wherein preferably the first primary strip comprises a microstrip as a feeding line and a meandering strip connected to the microstrip, which are both overlapped by the connected secondary strip.

25. Antenna assembly according to claim 1, wherein the isolated secondary strip on the bottom side of the central planar layer overlaps with the first primary strip on the top side of the central planar layer, wherein preferably the first primary strip comprises a linear strip which is overlapped by the isolated secondary strip.

26. Antenna assembly according to claim 1, wherein the planar body has a thickness in the range of 0.2 to 3.2 mm.

27. Antenna assembly according to claim 1, further comprising an assembly housing onto which the printed circuit board and the one or more antenna modules are mounted, wherein each antenna module is an antenna module.

28. Method of grounding an antenna assembly according to claim 12, wherein each antenna module is an antenna module.

* * * * *